United States Patent
Evans et al.

(10) Patent No.: US 8,621,629 B2
(45) Date of Patent: Dec. 31, 2013

(54) SYSTEM, METHOD, AND COMPUTER SOFTWARE CODE FOR DETECTING A COMPUTER NETWORK INTRUSION IN AN INFRASTRUCTURE ELEMENT OF A HIGH VALUE TARGET

(75) Inventors: Scott Charles Evans, Burnt Hills, NY (US); Yogesh Kesrinath Potdar, Niskayuna, NY (US); Michael Joseph Dell'Anno, Niskayuna, NY (US); Thomas Stephen Markham, Niskayuna, NY (US); Adam Edgar Klingbeil, Ballston Lake, NY (US); Robert Boring, Greenville, SC (US); Bruce Gordon Barnett, Troy, NY (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 12/873,309

(22) Filed: Aug. 31, 2010

(65) Prior Publication Data

US 2012/0054866 A1    Mar. 1, 2012

(51) Int. Cl.
    *H04L 29/06*    (2006.01)
(52) U.S. Cl.
    USPC .......................................................... 726/23
(58) Field of Classification Search
    USPC .................................................... 726/22–25
    See application file for complete search history.

(56) References Cited

U.S. PATENT DOCUMENTS

| | | | |
|---|---|---|---|
| 7,089,592 B2 | 8/2006 | Adjaoute | |
| 7,181,768 B1 | 2/2007 | Ghosh et al. | |
| 7,313,817 B2 | 12/2007 | Evans et al. | |
| 7,383,578 B2* | 6/2008 | Blake et al. | 726/23 |
| 7,409,716 B2 | 8/2008 | Barnett et al. | |
| 7,720,013 B1 | 5/2010 | Kelliher et al. | |
| 2006/0191008 A1* | 8/2006 | Fernando et al. | 726/23 |
| 2007/0011722 A1* | 1/2007 | Hoffman et al. | 726/3 |
| 2007/0289013 A1 | 12/2007 | Lim | |
| 2009/0024555 A1 | 1/2009 | Rieck et al. | |
| 2010/0107253 A1* | 4/2010 | Eiland et al. | 726/23 |
| 2010/0107254 A1 | 4/2010 | Eiland et al. | |
| 2010/0107255 A1 | 4/2010 | Eiland et al. | |

OTHER PUBLICATIONS

Zhou, Jian et al, "Analy. of Command Frequency and Command Sequence Grammar in IDS," 2008IEEE Conf. on Soft Computing in Indus. Apps. (SMCia/08), Jun. 25-27, pp. 113-118.

* cited by examiner

*Primary Examiner* — Gilberto Barron, Jr.
*Assistant Examiner* — David Le
(74) *Attorney, Agent, or Firm* — General Electric Company Global Research

(57) ABSTRACT

An intrusion detection system for detecting and defeating unauthorized intrusion within a computer network of an infrastructure element of a high value target, the system including a pre-processor configured to receive data from a computer network of an infrastructure element of a high value target and to output filtered data, a grammar applicator configured to apply grammars produced using a grammar based compression and learning algorithm to the filtered data, a decision making device configured to provide a recommendation based on an input from the grammar applicator as to whether the data in the computer network constitutes an unauthorized intrusion, and an emulator in communication with the decision making device configured to expand a sampling of the filtered data using a polymorphic transformation to allow the decision making device to further analyze the sampled data to determine an unauthorized intrusion. A method and a computer software code are also disclosed.

22 Claims, 4 Drawing Sheets

SYSTEM, METHOD, AND COMPUTER SOFTWARE CODE FOR DETECTING A COMPUTER NETWORK INTRUSION IN AN INFRASTRUCTURE ELEMENT OF A HIGH VALUE TARGET

BACKGROUND OF THE INVENTION

Exemplary embodiments generally relate to computer networks and, more particularly, to detection of unauthorized intrusions into a computer network of a high value target, such as, but not limited to, a power plant.

With a heightened focus on homeland defense, an increased scrutiny of security measures that are in place to protect national key infrastructure elements is occurring. Such key infrastructure elements include, but are not limited to, power plants, research facilities (especially those that utilize harmful materials), financial institutions, etc. When considering power plants, these infrastructure elements are vital to a nation's economy and welfare. Consequently, they represent a high value target for terrorists. The same is true of other infrastructure elements, but possibly to differing levels of importance.

A power plant, also referred to as a generating station, power station, and/or powerhouse, is an industrial facility for the generation of electric power. Power plants are used to convert other forms of energy, such as, but not limited to, chemical energy, gravitational potential energy, wind energy, or heat energy into electrical energy. The energy source harnessed depends chiefly on which fuels are easily available and on the types of technology that the power company has access to use.

Power plants vary greatly in capacity depending on a type of power plant and on historical, geographical and economic factors. But generally, the power generated by the power plant is measured in multiples of the watt, typically megawatts or gigawatts.

A computer network is typically provided to assist a power plant operator in performing his/her duties in the electrical generating facility. More specifically, the computer network is used for controlling and monitoring the technical processes of the power plant. To perform its functions, the computer network is integrated throughout the power plant to allow the plant operator to control and monitor various aspects of the power plant. With advances in technology, the computer network also allows processors to monitor and operate aspects of the power plant. In such cases, an operator is able to shut down a process if the process is operating improperly, but only after the operator notices an improper reading from monitored data.

The computer network also usually has a connection allowing for accessing and communicating with a plurality of computers or other electronic devices. The connection may be enabled over the Internet (through a wired or wireless access point), or through other paths, such as, but not limited to, a junction that accepts a removable module such as a USB stick or device. Though such networks are usually protected by a firewall, with advances in computer viruses and computer worms used in cyber attacks upon individual computers and computer networks, breaching a power plant firewall may be possible. For example, challenges with protecting a computer network are realized when trying to prevent polymorphic attacks (attacks that change in form) upon the computer network. Such attacks, which appear as authorized users could send attack traffic which could disable or weaponize power plants, which could result in power outages, plant damage, and/or compromise power plant information.

Considering continued advancements in computer viruses and desires of malicious individuals to use such computer programs to weaponize power plants, manufacturers, owners, and operators of power plants would realize security and financial benefits from being able to rapidly detect and repel cyber attacks upon a computer network used in operating power plants.

BRIEF DESCRIPTION OF THE INVENTION

Embodiments of the present invention relate to a system, method and computer software code for detecting and defeating an unauthorized intrusion within a computer network of an infrastructure element of a high value target. The system comprises a pre-processor configured to receive data from a computer network of an infrastructure element of a high value target and to output filtered data, and a grammar applicator configured to apply grammars produced using a grammar based compression and learning algorithm to the filtered data. The system further comprises a decision making device in communication with the grammar applicator configured to provide a recommendation based on an input from the grammar applicator as to whether the data in the computer network constitutes an unauthorized intrusion, and an emulator in communication with the decision making device configured to expand a sampling of the filtered data using a polymorphic transformation to allow the decision making device to further analyze the sampled data to determine an unauthorized intrusion.

The method comprises receiving data from a computer network used of an infrastructure element of a high value target, filtering the received data, and applying grammars produced with a grammar based compression and learning algorithm to the filtered data. The method further comprises expanding a sampling of the filtered data, after grammars have been applied, with polymorphic transformation, analyzing the expanded sampled data to determine an unauthorized intrusion, and recommending whether an unauthorized intrusion occurs based on the analyzed data.

The computer software code is stored on a computer readable medium and configured for execution with a processor. The computer software code comprises a computer software module, operable with a processor, for receiving data from a computer network of an infrastructure element of a high value target, and a computer software module, operable with a processor, for filtering the received data. The computer software code further comprises a computer software module, operable with a processor, for applying grammars produced with a grammar based compression and learning algorithm to the filtered data, and a computer software module, operable with a processor, for expanding a sampling of the filtered data, after grammars have been applied, with polymorphic transformation. The computer software code also comprises a computer software module, operable with a processor, for analyzing the expanded sampled data to determine an unauthorized intrusion, and a computer software module, operable with a processor, for recommending whether an unauthorized intrusion occurs based on the analyzed data.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
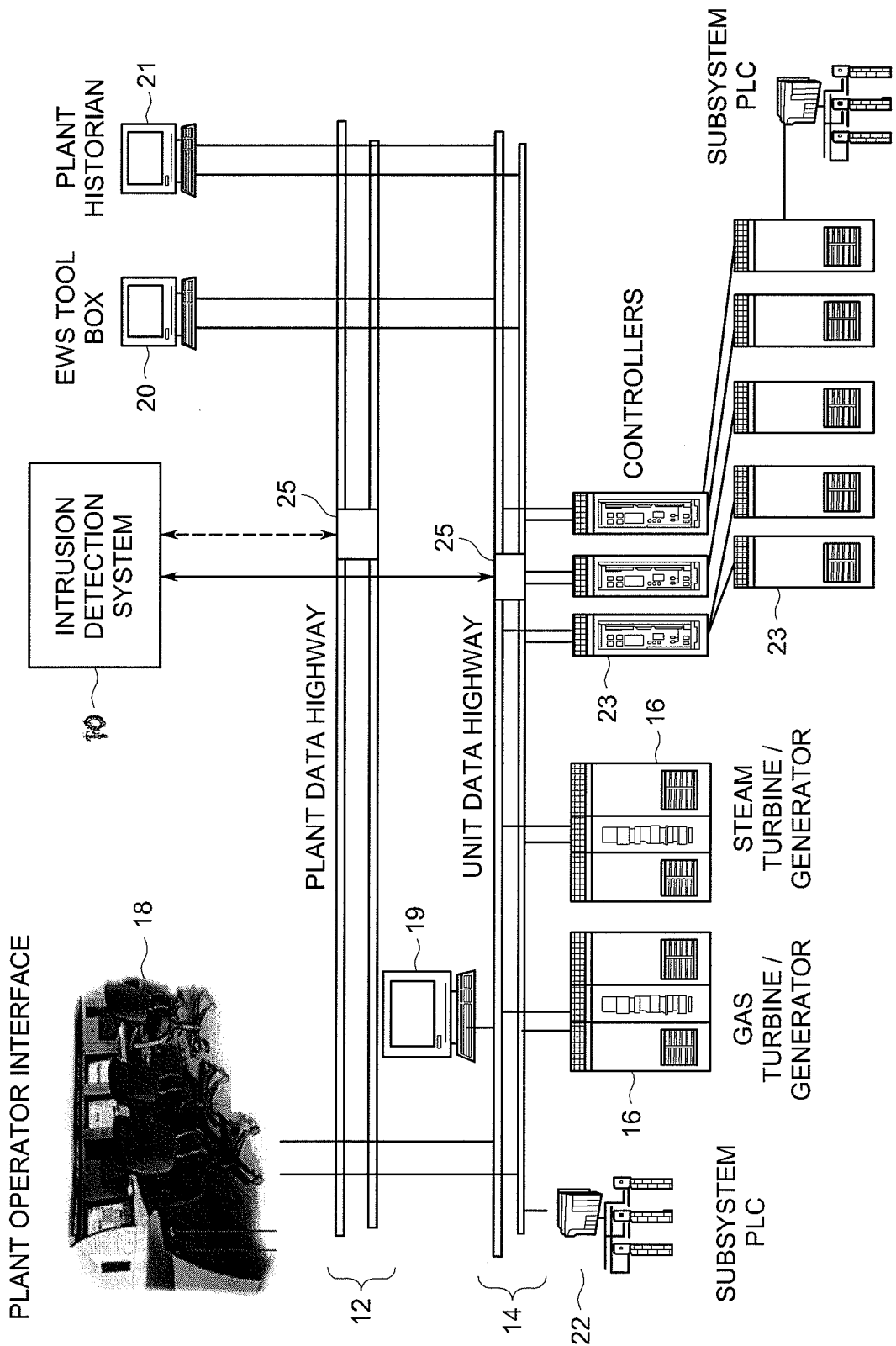
FIG. 1 depicts an exemplary embodiment of computer networks within a power plant with an intrusion detection system included.

Reference will be made below in detail to exemplary embodiments of the invention, examples of which are illustrated in the accompanying drawings. Wherever possible, the same reference numerals used throughout the drawings refer to the same or like parts. Exemplary embodiments of the invention solve problems in the art by providing a system, method, and computer software code for rapidly detecting and defeating a computer network intrusion in an infrastructure element of what may be identified as a high value target.

Though exemplary embodiments disclosed herein are specific to a power plant, the exemplary embodiments disclosed herein are also applicable to other infrastructure element high value targets, such as, but not limited to, a key research facility which could be mechanized as a weapon of mass destruction, and financial institutions where intrusion into its computer network could cause a financial meltdown.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk, computer readable media, or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, a technical effect is to provide for rapidly detecting and defeating a computer network intrusion within an infrastructure element of a high value target. To facilitate an understanding of the exemplary embodiments of the invention, it is described hereinafter with reference to specific implementations thereof. Exemplary embodiments of the invention may be described in the general context of computer-executable instructions, such as program modules, being executed by any device, such as, but not limited to, a computer, designed to accept data, perform prescribed mathematical and/or logical operations usually at high speed, where results of such operations may or may not be displayed. Generally, program modules include routines, programs, objects, components, data structures, etc., that performs particular tasks or implement particular abstract data types. For example, the software programs that underlie exemplary embodiments of the invention can be coded in different programming languages, for use with different devices, or platforms. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, or a data structure tangibly fixed in a computer readable memory. Several embodiments of the invention are discussed below.

FIG. 1 discloses an exemplary embodiment of a power plant computer network with an intrusion detection system 10 included. A power plant computer network may be a single fully integrated network of communications lines, or distinct data paths 12, 14, networks, or highways may be provided through which specific data traffic passes or flows each distinct network, as is illustrated in FIG. 1. Therefore, though multiple distinct paths are illustrated in FIG. 1, those skilled in the art will readily recognize that exemplary embodiment of the invention are applicable to a single network. A first path 12 is a plant data network and a second path 14 is a unit data network. The plant data network 12 is specific to the overall power plant whereas the unit data network 14 is specific to each individual power generator.

For example, if the power plant includes steam turbine generators 16, the unit data network 14 carries data specific for each steam turbine generator 16 through its network. Though steam turbine generators 16 are disclosed, those skilled in the art will readily recognize other power generation units that may be utilized as well, such as, but not limited to, nuclear-based, wind-based, and/or solar-based generation units. Each network 12, 14 may be connected to equipment required to operate the power plant, such as, but not limited to, a plant operator interface 18, human machine interface computer, 19, work stations 20, and a Plant Historian 21, which is a computerized record of the machine's performance for post-host analysis of alarms or shutdowns, etc. The unit data network 14 may be further in communication with program logic controllers 22, and other controllers and sub-systems 23 used to operate the steam turbine generators 16.

Though not necessarily required, an in-line switch intrusion prevention system 25, or switch, is also included. The in-line switch 25 may be in communication with both networks 12, 14, though not required. The switch 25 is in communication with the intrusion detection system 10, which is present even when the in-line switch intrusion prevention system 25 is not present. As discussed in more detail below, the switch 25 may be provided to filter traffic, a close port through which an intrusion is detected, notify personnel and/ or a device to take corrective action, redirect network traffic to another location, filter network traffic to limit a type of data that can use the network, and/or take other action in response to an intrusion as discussed herein.

Figure 2:
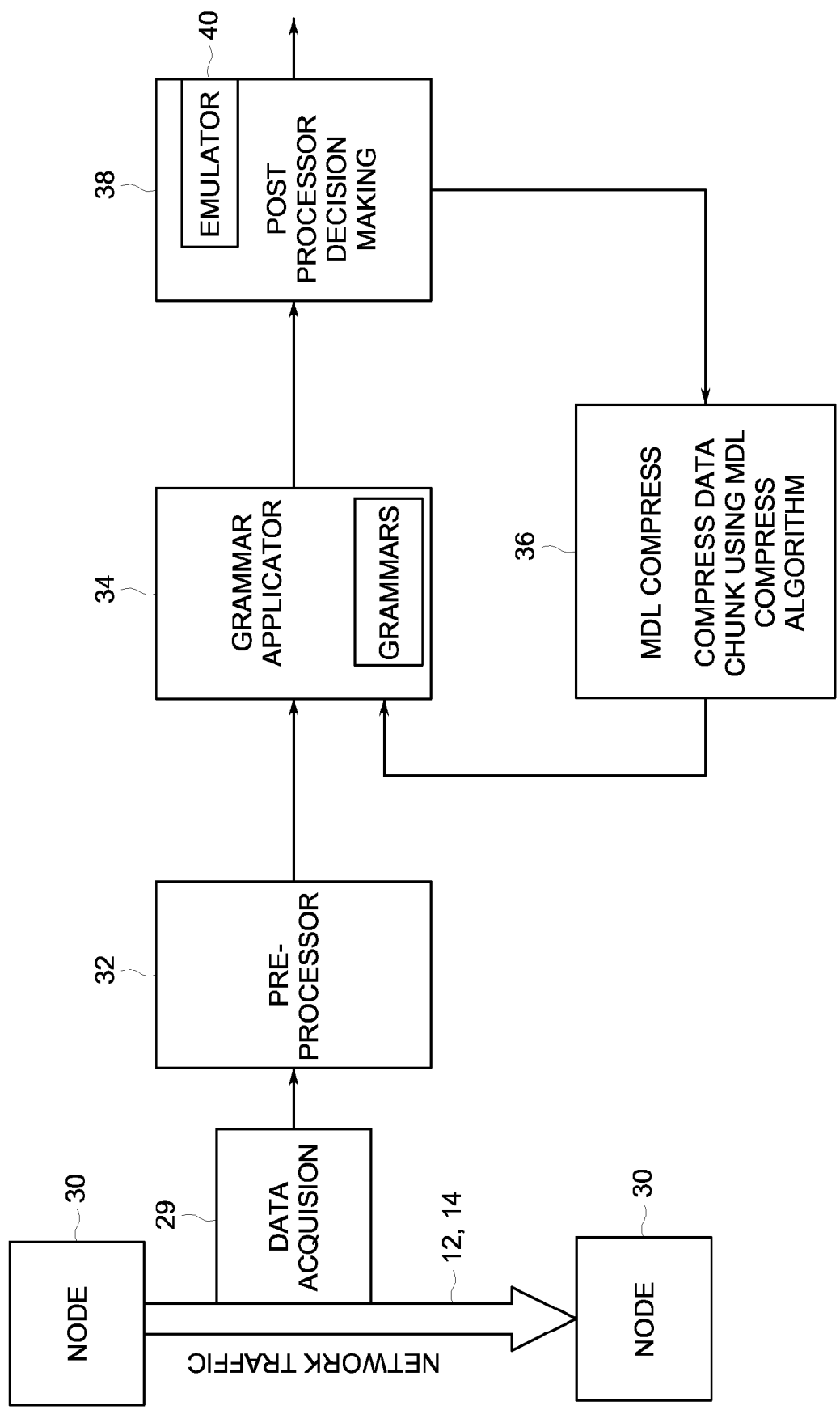
FIG. 2 depicts an exemplary embodiment of a process flow of data within an intrusion detection system.

FIG. 2 discloses a block diagram depicting an exemplary embodiment of an architecture for detecting an intrusion. As illustrated, data acquisition 29 occurs between two nodes 30 on either network 12, 14. The data is passed through a pre-processor 32 which filters and scrubs the data. The filtered data is next passed through a grammar applicator 34. The grammar applicator 34 can be configured to apply grammars produced using a compression and learning algorithm 36 to the filtered data received from the pre-processor 32. The data is then passed through a post processor/decision maker 38. The post processor 38 can be configured to provide a recommendation as to whether the input data has been classified as an attack, or intrusion. A sampling of the filtered data may be expanded using polymorphic transformation to allow the decision making device 38 to further analyze the sampled data to determine an unauthorized intrusion, or to constitute that an unauthorized intrusion is/has occurred.

As illustrated, an emulator 40 is included as part of the post processor/decision maker 38. Additional information about the emulator 38 is provided below. Data is also passed from the post processor 38 to a grammar based compression and learning algorithm 36, such as, but not limited to, a Minimum Description Length (MDL) compression algorithm ("MDL-compress"), which uses MDL principles and a theory of Kolmogorov Complexity and Algorithmic Information Theory to infer a compressive grammar, finding patterns and motifs that aid most in compressing unknown data sets. Using such an algorithm allows for classification polymorphisms of normal and attack behaviors or data wherein MDL clustering provides new ways to learn attack behaviors and distinguish polymorphic attacks as well as zero day attacks. The MDL-compress algorithm allows for both data to cluster itself in an MDL sense so that key information and behaviors can be partitioned and captured in a model as well as supervised learning on key training data so that experts can force models finding particular behavior. This is accomplished by passing results for use within the grammar applicator. Thus, the grammar based compression and learning algorithm is able to estimate Kolmogorov complexity and form compressive grammar based on Minimum Description Length principles.

Figure 3:
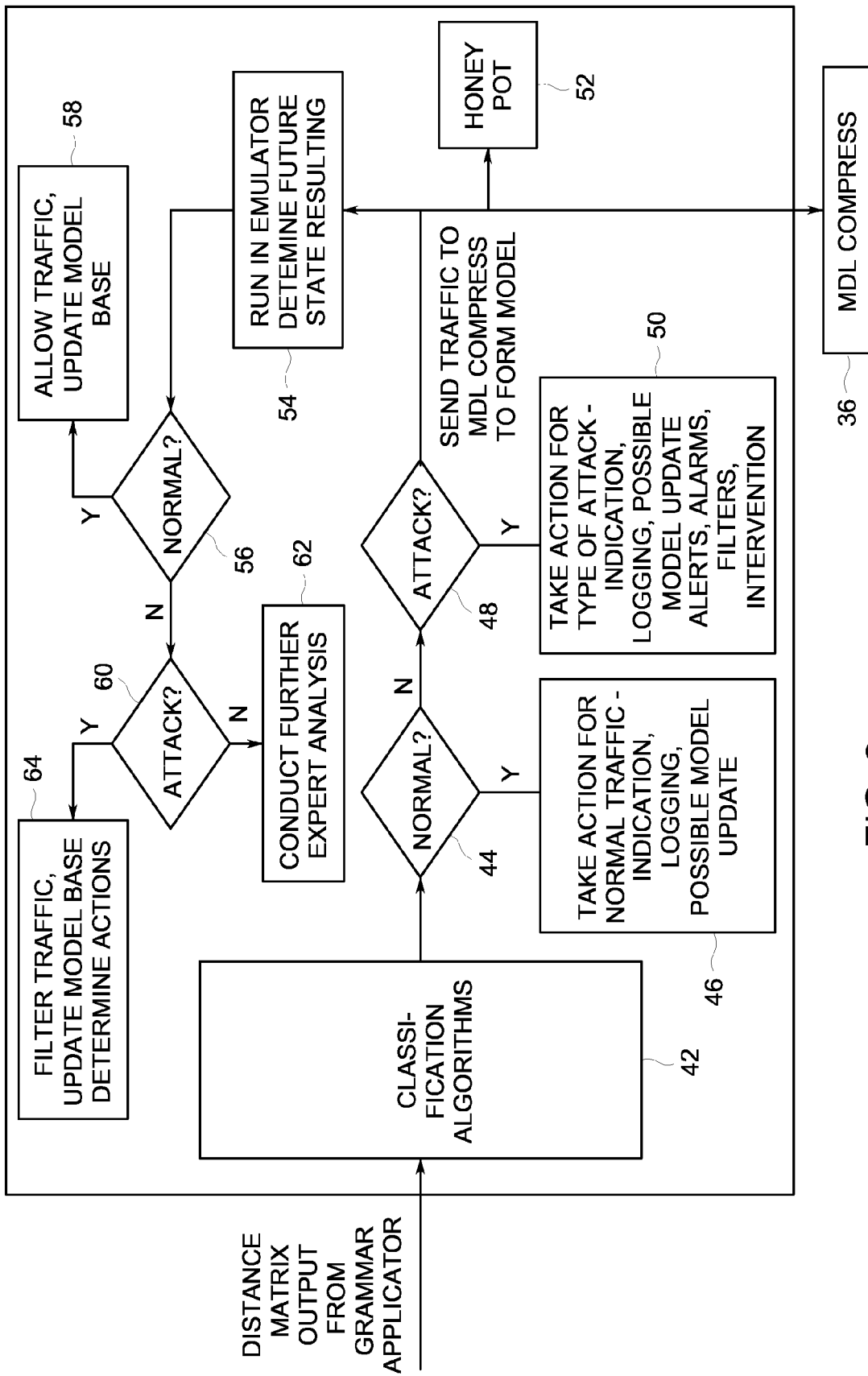
FIG. 3 depicts an exemplary embodiment of a process flow within a processor/decision maker within the intrusion detection system.

FIG. 3 discloses a flowchart of a process that occurs in the post processor/decision maker. As illustrated, at least one algorithm 42 classifies the data. Those skilled in the art recognize that more than one algorithm may be utilized. The algorithm 42 may be used to determine a likelihood of a fit between portions of the received data where there are pre-defined models of grammar-based compression data which the data is compared against. A decision gate 44 determines whether the data is normal or not. If the data is normal, normal operation continues 46, wherein no warning is sounded about an intrusion. Thus, normal data traffic protocols are followed, which may include, but are not limited to, indication, logging, and possible model updating.

If the determination is that the data is not normal, another decision gate 48 determines whether the data is part of an attack and/or intrusion. If the determination is that it is an attack, action is taken based on the type of attack 50, including such actions as indication (which might involve something as simple as alerts or notifications or as complex as dashboards giving graphical display depicting proximity to candidate attacks and confidence of classification), logging, possible model update, alerts, alarms, filters, and intervention. If not an attack, or intrusion, the data is passed to the grammar based compression and learning algorithm 36, such as, but not limited to, MDLcompress, to form a model. The data may also be passed to a honey pot 52, or a device that replicates a fake power plant, fake network, false network, and/or false system. The honey pot more is configured so as not to alert an attacker that the attack has been discovered. Thus, to an attacker, or intruder, the honey pot will appear to be the actual power plant when in essence it is actually inert data that resembles a network in the power plant and/or operations that may occur within the power plant, but in actuality does not interact with the actual operation and/or network of the power plant. Locating the attack, more specifically, data associated with the attack, in the honey pot 52 may allow time for authorities to track down the attacker, without the attacker's knowledge that the attack has been detected. The data sent to the honey pot 52 may be recorded and used to augment an existing algorithm for identifying an attack mode.

As mentioned above, the data may also be passed through the emulator 40 to determine future state results. Within the emulator 40, a segment of data is expanded using polymorphic transformation, such as with a polymorphic generator 54. This is done, in part, to overcome insufficient data, and doing so reduces a risk of being defeated by a polymorphic attack. Established power plant polices and protocols are used to reduce allowed or expected sequences of interactions so that normal behaviors are more easily identified. The emulator 40 may further utilize multiple distance metrics, hierarchical processing and ranking, and fuzzy models to reduce false alarms.

A determination is then made after running through the emulator whether the data is normal 56. If it is normal, the traffic is allowed to continue to flow 58. If the data is determined not to be normal, a determination of whether an attack is occurring is made 60. If no attack, then the data is further analyzed 62. If an attack is detected, actions are taken to prevent the attack 64, including updating the model(s) using the algorithm 36 to prevent future attacks by this and similarly polymorphisms of the attack. For example, if a sample is that was previously unclassified, through expert analysis is now classified as an attack, it can be used to update a model base. Filtering or pre-processing may be used to improve detectability of this new type of attack or polymorphism of a known attack. Thus, if a sample is determined to be a new type of attack a new model is added to the model base. Further, if a sample is determined to be a polymorphism of a known attack the model base may require updating to include a new model reflecting this type of polymorphism, or inclusion of the attack in the training set for the main attack type such that the model reflects this polymorphism as a more typical behavior.

More specifically, in one exemplary embodiment, one or more classification algorithms 42 determine, based on the grammar distance heuristics, whether observed traffic on the power plant network is normal, reflective of a previously modeled attack, and/or not able to be classified in accordance with previously observed models. Logging and graphic user interface (GUI) indications are updated with classification output. Traffic that is classified as attack traffic results in protective responses based on the nature of attack. The protective responses may consist of at least one of filtering the traffic (such as to allow only pertinent data to flow), closing of a port through which the traffic originated, notifying personnel and/or devices to take corrective action, for example paging or emailing key personnel, or activating at least one additional firewall, closing ports, redirection of traffic to the honey pot, and/or to the emulator to shield the power plant from the traffic while not alerting the attacker to the detection, and/or implementing another protective action so as to minimize the effects of the attack on the power plant network.

Traffic that is classified as unknown, potentially novel, or "zero day" attack traffic (an attack or threat that tries to exploit computer application vulnerabilities that are unknown to others or undisclosed to the software developer) is sent to the emulator 40 in order to determine a resulting power plant state that the traffic may cause. If the emulator 40 determines that the unknown traffic will produce a safe state on the power plant network the MDLcompress algorithm is added to the normal set. If the emulator 40 determines adverse state on the network, the traffic model is added to the attack set and appropriate actions are assigned. If the state is indeterminate, additional evaluation is performed.

In one exemplary embodiment, the emulator 40 performed is function at a rate faster than real time so that a decision regarding intervention does not disrupt normal traffic progression. In another exemplary embodiment, emulation by the emulator 40 is performed offline and models are then updated after the fact, or at a later time. In another implementation, the emulator 40 is constructed from models of power plant devices. The emulator 40 may exist offsite with traffic being remotely transferred to the emulator 40 either real time or after the fact as discussed above.

Figure 4:
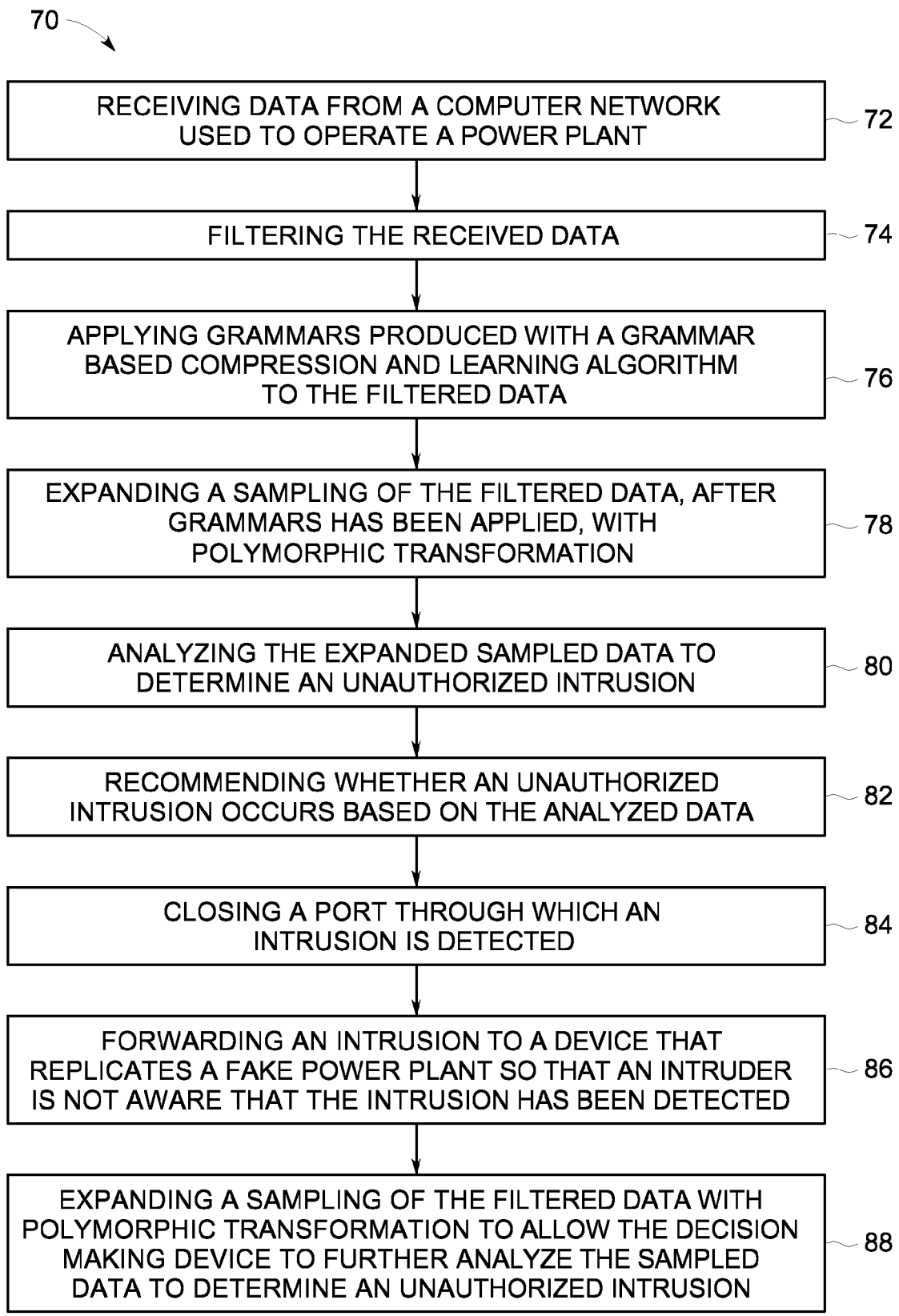
FIG. 4 depicts a block diagram illustrating an exemplary embodiment of a method for detecting and defeating unauthorized intrusion within a computer network used to operate a power plant.

FIG. 4 depicts a block diagram illustrating an exemplary embodiment of a method for detecting and defeating unauthorized intrusion within a computer network used to operate a power plant. The method 70 may also be implemented through a computer software code where each element, or step of the method is a computer software module that is operable with a processor. The computer software code is stored on a computer readable medium and configured for execution with a designated processor.

The method 70 comprises receiving data from a computer network used to operate a power plant, at 72. The received data is filtered, at 74. Grammars, produced with a grammar based compression and learning algorithm, are applied to the filtered data, at 76. Expanding a sampling of the filtered data, after grammars have been applied, with polymorphic transformation, is also disclosed, at 78. The expanded sampled data to determine an unauthorized intrusion is analyzed, at 80. A recommendation whether an unauthorized intrusion occurs based on the analyzed data is further provided, at 82. The method further comprises closing a port through which an intrusion is detected, at 84, and forwarding an intrusion to a device that replicates a fake power plant so that an intruder is not aware that the intrusion has been detected, at 86. The method may further comprise expanding a sampling of the filtered data with polymorphic transformation to allow the decision making device to further analyze the sampled data to determine an unauthorized intrusion, at 88.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., do not denote any order or importance, but rather the terms first, second, etc., are used to distinguish one element from another.

What is claimed is:

1. An intrusion detection system for detecting and defeating an unauthorized intrusion within a computer network of an infrastructure element of a high value target, the system comprising:

a pre-processor configured to receive data from the computer network of the infrastructure element of the high value target and to output filtered data;

a grammar applicator configured to apply grammars produced using a grammar based compression and learning algorithm to the filtered data;

a decision making device in communication with the grammar applicator and configured to provide a recommendation based on an input from the grammar applicator as to whether the data in the computer network constitutes the unauthorized intrusion; and an emulator in communication with the decision making device and configured to expand a sampling of the filtered data using a polymorphic transformation to allow the decision making device to further analyze the sampled data to determine the unauthorized intrusion.

2. The system according to claim 1, wherein the emulator performs its functions in real time so that a decision regarding intrusion does not disrupt normal computer network traffic progression.

3. The system according to claim 1, wherein the emulator is configured to perform emulation offline and update the grammar based compression and learning algorithm at a later time to detect future intrusion.

4. The system according to claim 1, wherein the emulator expands the sampled filtered data through an application of distance metrics, hierarchical processing and ranking, and/or fuzzy models.

5. The system according to claim 1, wherein the grammar based compression and learning algorithm estimates Kolmogorov complexity which forms compressive grammar based on Minimum Description Length principles.

6. The system according to claim 1, further comprising an in-line switch intrusion prevention system configured to close a port through which the unauthorized intrusion is detected, notify personnel and/or a device to take corrective action, redirect network traffic to another location, and/or filter network traffic to limit a type of data that can use the computer network.

7. The system according to claim 1, further comprising a honey pot configured to receive data associated with the unauthorized intrusion so that an intruder is not aware that the intrusion has been discovered.

8. The system according to claim 7, wherein the honey pot is further configured to record data and augment an existing algorithm for identifying an attack mode.

9. The system according to claim 1, wherein a sampling of the filtered data is expanded using polymorphic transformation to allow the decision making device to further analyze the sampled data to determine the unauthorized intrusion.

10. A method for detecting and defeating unauthorized intrusion within a computer network of an infrastructure element of a high value target, the method comprising:

receiving data from the computer network of the infrastructure element of the high value target;

filtering the received data;

applying grammars produced with a grammar based compression and learning algorithm to the filtered data;

expanding a sampling of the filtered data, after the grammars have been applied, with polymorphic transformation;

analyzing the expanded sampled data to determine the unauthorized intrusion; and recommending whether the unauthorized intrusion has occurred occurs based on the analyzed data.

11. The method according to claim 10, wherein analyzing the expanded sampled data occurs in real time so that a decision regarding the unauthorized intrusion does not disrupt normal computer network traffic progression.

12. The method according to claim 10, wherein expanding the sampled filtered data further comprises expanding the sampled filtered data using an application of distance metrics, hierarchical processing and ranking, and/or fuzzy models and/or wherein applying grammars produced with the grammar based compression and learning algorithm to the filtered data further comprises estimating Kolmogorov complexity which forms compressive grammar based on Minimum Description Length principles as part of the grammar based compression and learning algorithm.

13. The method according to claim 10, further comprising:
closing a port through which the unauthorized intrusion is detected;
notifying personnel and/or a device to take corrective action;
redirecting network traffic to another location;
activating at least one additional firewall; and/or
filtering network traffic to limit a type of data that can use the computer network.

14. The system according to claim 10, further comprising forwarding data associated with the unauthorized intrusion to a device that replicates a fake network so that an intruder is not aware that the intrusion has been detected.

15. The system according to claim 14, further comprising recording and using the data sent to the device that replicates the fake network to augment an existing algorithm for identifying an attack mode.

16. The system according to claim 10, further comprising expanding a sampling of the filtered data with polymorphic transformation to allow the decision making device to further analyze the sampled data to determine the unauthorized intrusion.

17. A non-transitory computer-readable media comprising routines which are executed on a processor for detecting and defeating an unauthorized intrusion within a computer network of an infrastructure element of a high value target, the non-transitory computer-readable media configured for:
receiving data from the computer network of the infrastructure element of a high value target;
filtering the received data;
applying grammars produced with a grammar based compression and learning algorithm to the filtered data;
expanding a sampling of the filtered data, after the grammars have been applied, with polymorphic transformation;
analyzing the expanded sampled data to determine the unauthorized intrusion; and
recommending whether the unauthorized intrusion has occurred based on the analyzed data.

18. The non-transitory computer-readable media according to claim 17, further configured for:
expanding the sampled filtered data using an application of distance metrics, hierarchical processing and ranking, and/or fuzzy models; and
estimating Kolmogorov complexity which forms compressive grammar based on Minimum Description Length principles as part of the grammar based compression and learning algorithm.

19. The non-transitory computer-readable media according to claim 17, further configured for:
closing a port through which the unauthorized intrusion is detected;
notifying personnel and/or a device to take corrective action;
redirecting network traffic to another location; and
filtering network traffic to limit a type of data that can use the computer network.

20. The non-transitory computer-readable media according to claim 17, further configured for forwarding data associated with the unauthorized intrusion to a device that replicates a fake network so that an intruder is not aware that the intrusion has been detected.

21. The non-transitory computer-readable media according to claim 20, further configured for recording and using the data sent to the device that replicates the fake network to augment an existing algorithm for identifying an attack mode.

22. The non-transitory computer-readable media according to claim 17, further configured for expanding a sampling of the filtered data with polymorphic transformation to allow the decision making device to further analyze the sampled data to determine the unauthorized intrusion.

* * * * *